US007241919B2

(12) United States Patent
Yada et al.

(10) Patent No.: US 7,241,919 B2
(45) Date of Patent: Jul. 10, 2007

(54) STORAGE TANK FOR EASILY POLYMERIZABLE COMPOUND AND METHOD OF STORAGE

(75) Inventors: Shuhei Yada, Mie (JP); Yasushi Ogawa, Mie (JP); Yoshiro Suzuki, Mie (JP); Kimikatsu Jinno, Mie (JP); Hirochika Hosaka, Mie (JP); Masayasu Goriki, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 166 days.

(21) Appl. No.: 11/133,184

(22) Filed: May 20, 2005

(65) Prior Publication Data

US 2005/0209482 A1 Sep. 22, 2005

Related U.S. Application Data

(60) Division of application No. 10/840,612, filed on May 7, 2004, which is a continuation of application No. PCT/JP02/11468, filed on Nov. 1, 2002, now Pat. No. 7,188,639.

(30) Foreign Application Priority Data

| Nov. 7, 2001 | (JP) | ............................ 2001-341348 |
| Dec. 25, 2001 | (JP) | ............................ 2001-390770 |
| Jan. 10, 2002 | (JP) | ............................ 2002-003223 |
| Jan. 28, 2002 | (JP) | ............................ 2002-017846 |

(51) Int. Cl.
*C07C 57/02* (2006.01)
(52) U.S. Cl. .................................................... 562/598
(58) Field of Classification Search ..................... None
See application file for complete search history.

(56) References Cited

U.S. PATENT DOCUMENTS

| 6,878,239 B1 | 4/2005 | Matsumoto et al. | |
| 2001/0018931 A1* | 9/2001 | Ijiri et al. | .................... 137/558 |

FOREIGN PATENT DOCUMENTS

| CN | 2133742 Y | 5/1993 |
| JP | 55-63894 | 5/1980 |
| JP | 55-94339 | 7/1980 |
| JP | 56-14300 | 2/1981 |
| JP | 10-500474 | 1/1998 |
| JP | 2000-344711 | 12/2000 |
| JP | 2001-227689 | 8/2001 |
| JP | 2001-233396 | 8/2001 |
| JP | 2001-233820 | 8/2001 |

* cited by examiner

*Primary Examiner*—Paul A. Zucker
(74) *Attorney, Agent, or Firm*—Oblon, Spivak, McClelland, Maier & Neustadt, P.C.

(57) ABSTRACT

The storage tank of the invention for an easily polymerizable compound is a storage tank having an acceptance piping and a delivery piping and is characterized by having a circulation line which directly connects the acceptance piping to the delivery piping or having circulation lines which respectively connect the acceptance piping to the storage tank and the storage tank to the delivery piping; the method of storing of the invention is characterized by storing an easily polymerizable compound in the storage tank while circulating the compound in the storage tank through the circulation line(s); the method of pipe jointing and apparatus therefor of the invention are a method of jointing pipes fitted to a handling apparatus in a production apparatus, storage apparatus, or the like for the purpose of transporting a corrosive liquid, the method being characterized in that the pipes are jointed with flanges, bolts, and nuts made of a material having resistance to corrosion by the corrosive liquid; the process for (meth)acrylic acid compound production of the invention is a process for producing and/or purifying a (meth)acrylic acid compound, and is characterized in that the temperature of a purified (meth)acrylic acid compound obtained which is being supplied to a storage tank is regulated so as to be not higher than the temperature of the purified (meth)acrylic acid compound residing in the storage tank; and the process of the invention for producing an easily polymerizable compound which is a (meth)acrylic acid compound is characterized in that the temperature of a (meth)acrylic acid compound-containing liquid which has been discharged as an off-specification product and is being supplied to a storage tank is regulated so as to be not higher than the temperature of the off-specification liquid stored in the storage tank.

7 Claims, 7 Drawing Sheets

STORAGE TANK FOR EASILY POLYMERIZABLE COMPOUND AND METHOD OF STORAGE

This Application is a Division of application Ser. No. 10/840,612 filed on May 7, 2004.

TECHNICAL FIELD

The present invention relates to a storage tank for storing (meth)acrylic acid or an ester or another derivative thereof as an easily polymerizable compound, and to a method of storing the compound. More particularly, the invention relates to a tank and method for storing an easily polymerizable compound, wherein the acrylic acid is prevented from polymerizing or freezing in the acceptance piping and delivery piping connected to the storage tank and from thus clogging the pipe line. The invention further relates to a method of jointing pipes fitted to a handling apparatus in a production apparatus, storage apparatus, or the like for the purpose of transporting a corrosive liquid, more particularly, a method of pipe jointing in which liquid leakage through joints in the piping is prevented by employing stainless steel, which has excellent corrosion resistance, as piping members for use in the pipe jointing method, such as flanges, bolts, and nuts. The invention furthermore relates to a process for producing a (meth)acrylic acid compound, in which a reduction in equipment cost in a storage tank for storing, in particular, a condensate of a (meth)acrylic acid compound purified in a distillation column is attained by reducing the area of heat-transfer surface for a heat exchanger attached to the storage tank. The invention still further relates to a process for producing an easily polymerizable compound which is a (meth)acrylic acid compound, in particular, a process for producing an easily polymerizable compound in which when an off-specification product discharged from a plant for producing acrylic acid or the like is temporarily stored in a tank for the purpose of recovering valuable substances, the off-specification product is cooled before being transported to the tank to thereby enable the valuable substances to be recovered at a high efficiency.

Incidentally, the term (meth)acrylic acid compound used in the invention implies not only acrylic acid and methacrylic acid (hereinafter referred to as "(meth)acrylic acid") but also esters of the (meth)acrylic acid.

BACKGROUND ART

In a tank in which an easily polymerizable compound is stored, polymerization in the tank has hitherto been prevented by connecting the delivery piping fitted to the tank to the tank by a circulation line and circulating the liquid residing in the tank through the circulation line.

However, when solution supply to the tank is stopped, the solution residing in the acceptance piping connected to the tank does not move. There has hence been a problem that solution polymerization or freezing occurs in this piping to clog the piping.

Furthermore, since the solution residing should be withdrawn in order to avoid the polymerization or freezing, a product loss has been incurred.

On the other hand, in pipings for transporting corrosive liquids including (meth)acrylic acid, carbon steel has generally been used extensively as the material of flanges, bolts, nuts, etc. as members for these pipings from the standpoints of a reduction in construction cost, etc.

However, the carbon steel is gradually corroded by the corrosive liquid during long-term use, and there have been cases where even when the joints are tightened so as to stop leakage of the corrosive liquid, this liquid leakage cannot be eliminated.

In addition, apparatus, pipings, and the like in which such a corrosive liquid is handled are frequently fitted with a heat insulator or cold insulator. Because of this, initial leakage is difficult to find out and there are often cases where leakage is found out only when the flanges, bolts, nuts, and the like have come into a considerably corroded state.

Once those piping members come into such a state, it is impossible to prevent liquid leakage by taking measures such as tightening. In some cases, the leakage of the corrosive liquid spreads, unavoidably leading to a problem of environmental pollution.

Repairing the corroded parts is considerably dangerous and the operation for withdrawing the corrosive liquid has necessitated much time. There has hence been a strong desire for a measure against these.

In processes heretofore in use for producing a (meth) acrylic acid compound known as an easily polymerizable substance by catalytic vapor-phase oxidation, the (meth) acrylic acid compound is separated or purified and the product is obtained generally from the top of the final purification column (distillation column).

This product is sent to a quality verification tank for the purpose of quality verification, subjected to a product inspection, and then stored in a storage tank. In some cases, the product is directly sent to a storage tank and stored therein.

In the case where a (meth)acrylic acid compound which is an easily polymerizable substance is produced and/or purified and the product is stored, it is necessary for regulate/ keep the storage tank for storing the product so as to be in a relatively low-temperature state in order to prevent polymerization and avoid the formation of a detonating gas and, in the case of acrylic acid, to inhibit the formation of acrylic acid dimer.

Because of this, the storage tank is equipped with an apparatus for temperature regulation (mainly for maintaining a cooled state). This apparatus attached to the storage tank is a cooling coil disposed inside the tank or a heat exchanger disposed outside the tank. Temperature regulation has been thus conducted.

On the other hand, since the product to be obtained from the top of the purification column in each process is easily polymerizable, distillation is conducted usually under vacuum in order to lower the operation temperature.

The gas from the column top is cooled while passing through a condenser, whereby a condensate as a product is obtained. The temperature of this condensate is generally about 40° C. because of industrial utility conditions.

Subsequently, this condensate as a product is transported to a storage tank and stored therein. For the storage, it is necessary to regulate/keep the condensate in the storage tank so as to have a relatively low temperature not higher than that temperature. Hitherto, the attached apparatus for temperature regulation/keeping has been relatively large and the equipment cost has been high.

Furthermore, since (meth)acrylic acid compounds are exceedingly apt to polymerize, there are cases where polymerization occurs during production, for example, in a distillation column to stop the operation of the whole plant for producing the (meth)acrylic acid compounds. There also are cases where the operation of the whole plant for acrylic acid compound production is stopped because of a legal examination or according to the state of the market.

When plant operation is stopped, the process liquids present in the plant are not discarded because they contain valuable substances, and are generally stored in an off-specification product storage tank for the purpose of recovery. In the next operation, valuable substances are recovered or the process liquids are utilized in the plant.

In the case of producing a (meth)acrylic acid compound which is an easily polymerizable substance, an off-specification liquid generates at the time of plant operation initiation or stopping or when part of the apparatus and devices constituting the plant comes not to work properly. In storing this off-specification liquid, it is necessary to keep the liquid at a relatively low temperature in order to prevent polymerization and avoid the formation of a detonating gas and, in the case of acrylic acid, to inhibit the formation of acrylic acid dimer.

Because of this, the storage tank for an off-specification product is equipped with an apparatus for temperature regulation (mainly for maintaining a cooled state). This apparatus attached to the storage tank is a cooling coil disposed inside the tank or a heat exchanger disposed outside the tank. Thus, temperature regulation is conducted.

However, when plant operation is stopped, for example, the liquids in the respective steps, which have various compositions, flow in a high-temperature state into the off-specification storage tank in large quantities. Hence, cooling becomes insufficient, resulting in the possibility of polymerization of the (meth)acrylic acid compound which is an easily polymerizable substance. In addition, since the off-specification liquid is exposed to a high temperature for a prolonged time period, the rate of reactions in which the water, alcohol, and (meth)acrylic acid compound contained in the off-specification liquid change into high-boiling substances by the Michael addition reaction is increased and high-boiling substances are formed in a large amount.

An example of measures against those problems is to increase the cooling ability of the internal (cooling) coil to be disposed as an attached apparatus in the off-specification storage tank or of the heat exchanger to be disposed outside the tank to such a degree that the high-temperature liquids which generate in large quantities in the plant operation stopping can be sufficiently cooled. Those problems can be thus coped with.

However, to install a large heat exchanger or the like which is effective in plant stopping occurring once or twice a year is economically disadvantageous, and some measures have been desired.

DISCLOSURE OF THE INVENTION

The invention provides in one aspect thereof a storage tank and storage method in which the (meth)acrylic acid or the like, which is an easily polymerizable compound, stored in the tank is kept being circulated through an acceptance piping and delivery piping connected to the tank to thereby prevent clogging of the pipings.

The invention provides in a second aspect thereof both a pipe jointing method for an apparatus for handling corrosive liquids and the apparatus, wherein flanges, bolts, nuts, and the like which are made of an acid-resistance material are used as members for the piping to thereby prevent leakage of a corrosive liquid over long.

The invention provides in a third aspect thereof a process for producing a (meth)acrylic acid compound, wherein an apparatus attached to a storage tank for storing the (meth) acrylic acid compound is made smaller to thereby attain a reduction in equipment cost.

The invention provides in a fourth aspect thereof a process for producing an easily polymerizable compound, wherein the problems described above concerning the storage of off-specification products, etc. have been eliminated.

Namely, essential points of the invention reside in the following.

(1) A storage tank for an easily polymerizable compound which has an acceptance piping and a delivery piping, characterized by having a circulation line which directly connects the acceptance piping to the delivery piping or having circulation lines which respectively connect the acceptance piping to the storage tank and the storage tank to the delivery piping.

(2) The storage tank for an easily polymerizable compound as described in (1) above, characterized in that the acceptance piping and the delivery piping each have a valve in the pipe line, and a circulation line has been connected to just after the valve in the acceptance piping and to just before the valve in the delivery piping.

(3) The storage tank for an easily polymerizable compound as described in (1) or (2) above, characterized in that the easily polymerizable compound is (meth)acrylic acid or an ester thereof.

(4) The storage tank as described in any one of (1) to (3) above, characterized in that the materials of the flanges, bolts, and nuts used in each joint in the piping fitted to a handling apparatus of the storage tank are materials having resistance to corrosion by the easily polymerizable compound.

(5) The storage tank as described in any one of (1) to (4) above, characterized in that the material of the gasket interposed between the flanges at each joint in the piping fitted to a handling apparatus of the storage tank is a fluororesin.

(6) The storage tank as described in any one of (1) to (5) above, which has a heat exchanger disposed in the line system for supply to the storage tank.

(7) A method of storing an easily polymerizable compound, characterized by storing the easily polymerizable compound in the storage tank as described in any one of (1) to (6) above while circulating the easily polymerizable compound residing in the storage tank through the circulation line(s).

(8) The method as described in (7) above, characterized in that the temperature of a purified (meth)acrylic acid compound which is being supplied to the storage tank is regulated so as to be not higher than the temperature of the purified (meth)acrylic acid compound residing in the storage tank.

(9) The method as described in (7) above, characterized in that the temperature of a (meth)acrylic acid compound-containing liquid which has been discharged as an off-specification product and is being supplied to the storage tank is regulated so as to be not higher than the temperature of the off-specification liquid stored in the storage tank.

(10) A method of jointing pipes fitted to a handling apparatus in a production apparatus, storage apparatus, or the like for the purpose of transporting a corrosive liquid, characterized in that the pipes are jointed with flanges, bolts, and nuts made of a material having resistance to corrosion by the corrosive liquid.

(11) The method of pipe jointing as described in (10) above, characterized in that the material having corrosion resistance is stainless steel.

(12) The method of pipe jointing as described in (10) or (11) above, characterized in that the pipes are jointed through a gasket made of a fluororesin interposed between the flanges attached to the joint parts of the pipes.

(13) The method as described in any one of (10) to (12) above, characterized in that a leakage detection hole is formed in a lower part of a heat insulator or cold insulator in each flange part.

(14) A process for (meth)acrylic acid compound production which is a process for producing and/or purifying a (meth)acrylic acid compound, characterized in that the temperature of a purified (meth)acrylic acid compound obtained which is being supplied to a storage tank is regulated so as to be not higher than the temperature of the purified (meth) acrylic acid compound residing in the storage tank.

(15) The process for (meth)acrylic acid compound production as described in (14) above, wherein the purified (meth)acrylic acid compound is a condensate as a distillate from a column top, and a line system for supplying the condensate to the storage tank has a heat exchanger disposed therein.

(16) The process for (meth)acrylic acid compound production as described in (14) or (15) above, wherein the temperature of the purified (meth)acrylic acid compound which is being supplied to the storage tank is from 0 to 35° C.

(17) A process for producing an easily polymerizable compound which is a (meth)acrylic acid compound, characterized in that the temperature of a (meth)acrylic acid compound-containing liquid which has been discharged as an off-specification product and is being supplied to a storage tank is regulated so as to be not higher than the temperature of the off-specification liquid stored in the storage tank.

(18) The process for producing an easily polymerizable compound as described in (17) above, characterized in that the temperature of the off-specification liquid stored in the storage tank is from 0 to 60° C.

(19) The process for producing an easily polymerizable compound as described in (17) or (18) above, characterized in that the temperature of the off-specification liquid before being regulated is from 61 to 200° C.

(20) The process for producing an easily polymerizable compound as described in any one of (17) to (19) above, characterized in that the off-specification liquid is either bottoms discharged from an evaporation column, distillation column, oxidation reactor, or extraction column or a liquid obtained by heating the bottoms.

In the figures, numerals and signs have the following meanings: A denotes a storage tank, B a circulating pump, C a heat exchanger for cooling, D a valve, 1 an acceptance piping, 2 a delivery piping, and 3 to 6 a circulation line; E denotes a purification column, F a reboiler, G a condenser, H a vent condenser, J a reflux vessel, K a heat exchanger for product temperature regulation, M a storage tank, N a heat exchanger for tank liquid temperature regulation, O a coil for liquid temperature regulation, P a tank for quality verification, 11 a supply line for liquid to be purified, and 21 a withdrawal line for delivery, etc.; and symbol a denotes an acrylic acid collection column, b a dehydration column, c a low-boiling separation column (acetic acid separation column), d a high-boiling separation column (acrylic acid purification column), e a high-boiling decomposition reactor, f a distillation column, g a stripping column, h a high-boiling removal column, i a solvent purification column, k an esterification reactor, m an acrylic acid separation column, n a high-boiling decomposition reactor, p an alcohol recovery column, q an alcohol extraction column, r a low-boiling separation column, s an acrylic ester product purification column, t a heat exchanger for off-specification liquid temperature regulation, u an off-specification product storage tank, v a heat exchanger for liquid temperature regulation, w a coil for liquid temperature regulation, 104 a supply line for acrylic-acid-containing gas, 131 a supply line for acrylic acid, 132 a supply line for alcohol, 135 a supply line for circulating acrylic acid, 148 a supply line for circulating alcohol, and 161 to 165, 167 to 171, and 172 to 177 a plant withdrawal line.

BEST MODE FOR CARRYING OUT THE INVENTIONS

The storage tank and storage method for an easily polymerizable compound according to the first aspect of the invention will be explained based on accompanying drawings.

Figure 1:
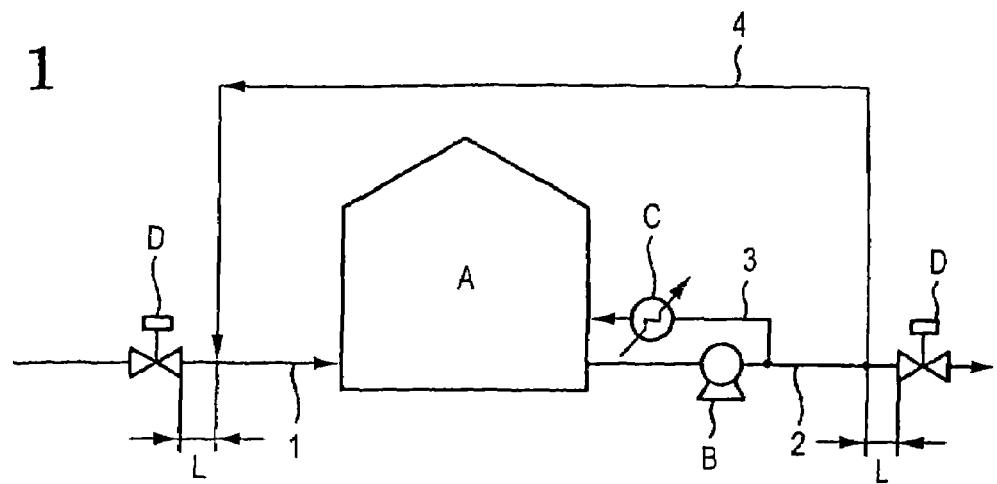
FIG. 1 is a view illustrating the whole of a first embodiment of the storage tank according to the first aspect of the invention.
Figure 2:
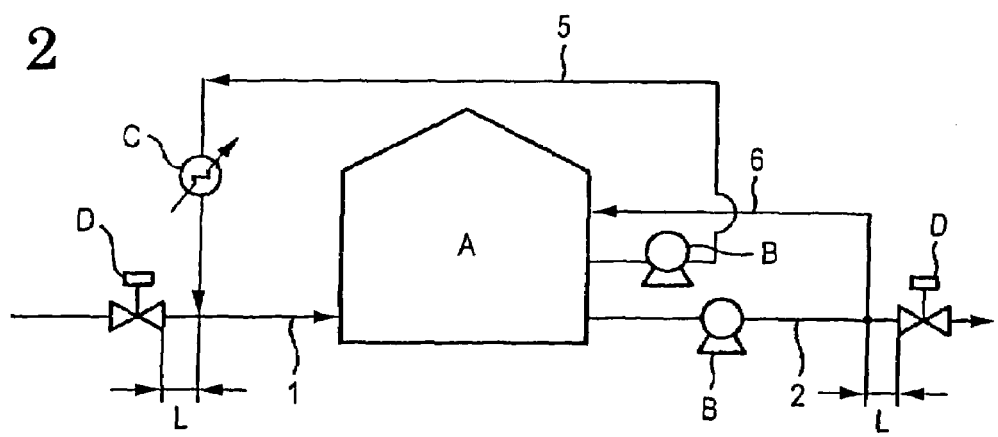
FIG. 2 is a view illustrating the whole of a second embodiment of the storage tank according to the first aspect of the invention.
Figure 3:
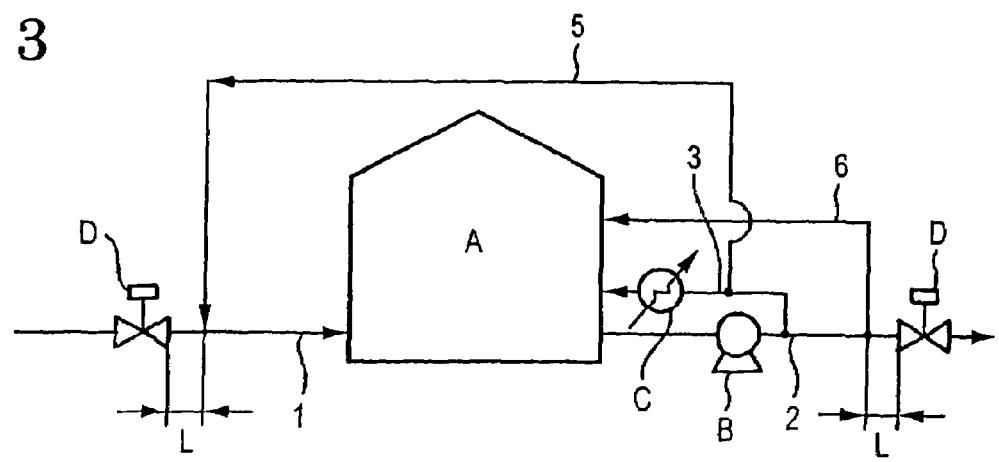
FIG. 3 is a view illustrating the whole of a third embodiment of the storage tank according to the first aspect of the invention.

FIG. 1 is a view illustrating the whole of a first embodiment of the storage tank according to the first aspect of the invention; FIG. 2 is a view illustrating the whole of a second embodiment of the storage tank according to the first aspect of the invention; and FIG. 3 is a view illustrating the whole of a third embodiment of the storage tank according to the first aspect of the invention.

In FIG. 1, A denotes a storage tank, and an acceptance piping 1 and a delivery piping 2 have been connected to the storage tank A.

B denotes a circulating pump. This circulating pump has been disposed in the delivery piping 2.

Furthermore, the discharge side of the circulating pump B has been connected to the storage tank A by a circulation line 3. The circulation line 3 has a heat exchanger for cooling C disposed therein.

D denotes a valve. These valves D have been disposed in the acceptance piping 1 and delivery piping 2, respectively.

Numeral 4 denotes a circulation line. This circulation line 4 has been connected to that part of the pipe line which is located at a distance of L from and just after the valve D disposed in the acceptance piping 1 and to that part of the pipe line which is located at a distance of L from and just before the valve D disposed in the delivery piping 2. The circulation line 4 thus directly connects the acceptance piping 1 to the delivery piping 2. The distance L preferably is regulated to 500 mm or shorter.

In FIG. 2, 5 denotes a circulation line. This circulation line 5 has been connected to that part of the acceptance piping 1 which is located at a distance of L from and just after the valve D disposed in the acceptance piping 1 and to the storage tank A. This circulation line 5 has a circulating pump B and a heat exchanger for cooling C both disposed therein.

Numeral 6 also denotes a circulation line. This circulation line 6 connects that part of the delivery piping 2 which is located at a distance of L from and just before the valve D disposed in the delivery piping 2 to the storage tank A.

In FIG. 3, 5 denotes a circulation line. This circulation line 5 connects that part of the acceptance piping 1 which is located at a distance of L from and just after the valve D disposed in the acceptance piping 1 to the circulation line 3.

Numeral 6 also denotes a circulation line. This circulation line 6 connects that part of the delivery piping 2 which is located at a distance of L from and just before the valve D disposed in the delivery piping 2 to the storage tank A.

The flow of a solution in the case of using the storage tank shown in FIG. 1 according to the first aspect of the invention will be explained.

For example, the acrylic acid, an easily polymerizable compound, which was obtained in an acrylic acid production step is supplied to the storage tank A through the valve D disposed in the acceptance piping 1.

For the purpose of preventing polymerization and quality deterioration, the acrylic acid supplied to the storage tank A is partly returned to the storage tank A again through the delivery piping 2, circulating pump B, and circulation line 3.

On the other hand, the acrylic acid which has been discharged into the delivery piping 2 through the circulating pump B is sent to a next step through the valve D.

Next, an explanation will be given on the flow of a solution in the case where the valves D disposed respectively in the acceptance piping 1 and the delivery piping 2 are closed and acrylic acid is stored in the storage tank A.

The acrylic acid in the storage tank A is sucked by the circulating pump B through the delivery piping 2. The acrylic acid discharged from the circulating pump B is partly returned to the storage tank A through the circulation line 3 and the heat exchanger for cooling C.

The acrylic acid in the storage tank A is stirred by this circulating liquid returned to thereby keep the concentration of a polymerization inhibitor even. Furthermore, the temperature of the liquid in the storage tank A is kept at 15 to 25° C. with the cooling heat exchanger C disposed in the circulation line 3.

The acrylic acid which has flowed into the delivery piping 2 from the circulating pump B flows into the circulation line 4, which has been connected to the position located at a distance of L from and just before the valve D disposed in the delivery piping 2. This acrylic acid is introduced, through this circulation line 4, into that part of the acceptance piping 1 which is located at a distance of L from and just after the valve D disposed in the acceptance piping 1, and is then returned again to the storage tank A through the acceptance piping 1.

When the distance L is 500 mm or smaller, the solution residing in this part circulates due to the flow of the solution. Solution replacement thus occurs.

However, in case where the distance L is too long, the solution resides in this part for a prolonged time period and no replacement occurs. Long distances of L are hence undesirable because polymerization or freezing is apt to occur.

In the embodiment of the first aspect of the invention shown in FIG. 1, the acrylic acid which is being stored in the storage tank A is kept being circulated through the acceptance piping 1→storage tank A→delivery piping 2→circulation line 4→acceptance piping 1 in this order, whereby the acrylic acid is prevented from freezing in the pipes. It has hence become possible to prevent the acrylic acid from clogging the acceptance piping 1 and the delivery piping 2.

In the embodiments explained above, the two valves D were both open or closed. However, the first aspect of the invention is applicable also in the case where one is closed and the other is open according to need in operation. In opening/closing each valve D, it may be operated either manually or automatically.

Next, an explanation will be given below on the flow of a solution in the case of using the storage tank shown in FIG. 2 according to the first aspect of the invention in which the valves D are both closed.

The circulating pump B disposed in the circulation line 5 is operated to introduce the solution in the storage tank A into the circulation line 5. The solution passes through the cooling heat exchanger C and is regulated so as to have a given temperature. This solution is then returned again to the storage tank A through the acceptance piping 1.

Thus, a circulation line consisting of the acceptance piping 1→storage tank A→circulation line 5→acceptance piping 1 is constituted.

On the other hand, the circulating pump B disposed in the delivery piping 2 is operated to introduce the solution in the storage tank A into the circulation line 6 and then returned to the storage tank again.

Thus, a circulation line consisting of the storage tank A→delivery piping 2→circulation line 6→storage tank A is constituted.

Finally, an explanation will be given below on the flow of a solution in the case of using the storage tank shown in FIG. 3 according to the first aspect of the invention in which the valves D are both closed.

The circulating pump B disposed in the delivery piping 2 is operated to pass the solution in the storage tank A through the circulation line 3 and a cooling heat exchanger C and return it to the storage tank A.

Furthermore, part of the solution which has flowed into the circulation line 3 is introduced into the circulation line 5 and returned again to the storage tank A through the acceptance piping 1.

Moreover, the solution in the delivery piping 2 is returned again to the storage tank A through the circulation line 6 connected to the position located at a distance of L from and just before the valve D disposed in the delivery piping 2.

Thus, a circulation line consisting of the acceptance piping 1→storage tank A→circulation line 5→acceptance piping 1 and a circulation line consisting of the storage tank A→delivery piping 2→circulation line 6→storage tank A are constituted.

Incidentally, also in the embodiments shown in FIGS. 2 and 3 explained above, the two valves D were both closed as in FIG. 1. However, the invention is applicable also in the case where both are open or where one is closed and the other is open according to need in operation. In opening/closing each valve D, it may be operated either manually or automatically.

The easily polymerizable compound in the first aspect of the invention means a compound which readily polymerizes to form a polymer during handling in, e.g., reaction or distillation. Typical examples thereof include (meth)acrylic acid and esters thereof, e.g., the methyl, ethyl, butyl, isobutyl, tertiary butyl, 2-ethylhexyl, 2-hydroxyethyl, 2-hydroxypropyl, and methoxyethyl esters and the like.

Examples of the storage tank A include a product tank for storing a product to be shipped, an inspection tank for ascertaining before sending to a product tank that a product satisfies specifications, an off-specification product tank for placing off-specification liquids therein, a heavy-matter tank for placing therein heavy matters obtained in a purification system, a buffer tank connecting distillation columns, and the like.

Preferred embodiments of the first aspect of the invention are applications to a piping which connects a purification column in a production step to an inspection tank and a piping which connects an inspection tank to a product tank.

The second aspect of the invention will be explained below.

Examples of the corrosive liquid in the second aspect of the invention include organic acids such as (meth)acrylic acid, maleic acid, dimer acids, and p-toluenesulfonic acid and inorganic acids such as hydrochloric acid and nitric acid.

Furthermore, examples of the corrosion-resistant material in the second aspect of the invention include stainless-steel materials, titanium materials, hastelloy materials, and resin moldings made of, e.g., a polyester. The material may be one to which corrosion resistance has been imparted by lining or coating the surface.

The material of the gasket to be interposed between flanges is also important. It is preferred to use a sheet gasket made of an elastic fluororesin, because it shows excellent corrosion resistance in the leakage of the corrosive liquid and is effective in tightening.

Examples of the fluororesin include polytetrafluoroethylene (PTFE), ethylene fluoride/polypropylene copolymers (FEP), tetrafluoroethylene/perfluoroalkyl vinyl ether copolymers (PFA), tetrafluoroethylene/ethylene copolymers (ETFE), polychlorotrifluoroethylene (PCTFE), poly(vinylidene fluoride) (PVDF), poly(vinyl fluoride) (PVF), trifluorochloroethylene/ethylene copolymers (ECTFE), and the like. These are excellent in chemical resistance, heat resistance, electrical insulating properties, and non-tackiness and have low-frictional properties. In particular, specific examples of the PTFE include Teflon (DuPont) and Fluon (ICI).

Examples of the sheet gasket include ones formed from any of those fluororesins alone and ones obtained by covering a base with a fluororesin sheet. The base is not particularly limited.

Furthermore, a composite material containing a fluororesin as the main component may be used as the only material for a sheet gasket or as a covering sheet.

The flange parts and pipings or the like attached to the instrument side of production or storage apparatus in which a corrosive liquid is handled are frequently fitted with a heat insulator or cold insulator. In case where leakage through these flange parts occurs, the heat or cold insulator corrodes and there are often cases where the leakage through the flange parts is found out only when leakage through the heat or cold insulator occurs.

Since the flanges, bolts, and nuts or the heat or cold insulator is in such a state, the corrosion thereof has proceeded considerably. Consequently, the corrosion leads to a problem of environmental pollution caused by the spread of the corrosive-liquid leakage, and an operation for repairing the flange parts is considerably dangerous and requires much time.

Because of these, a leakage detection hole of from 1 to 10 mm, preferably from 1 to 3 mm, may be formed in a lower part of the heat insulator or cold insulator in each flange part. This enables the occurrence of leakage to be found out in an early stage and can minimize the damage by the liquid leakage.

The process for acrylic acid compound production according to the third aspect of the invention will be explained based on an accompanying drawing.

Figure 4:
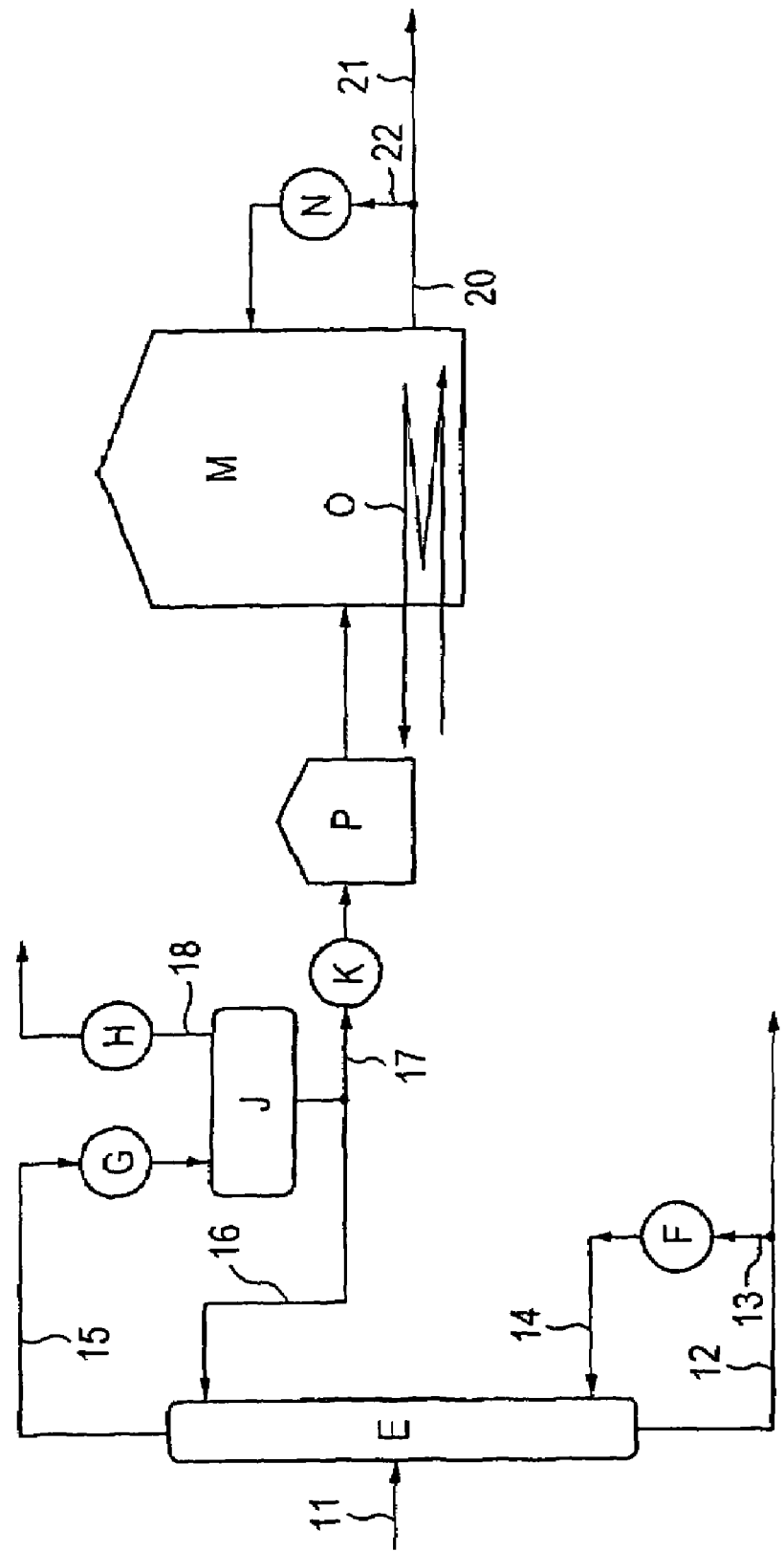
FIG. 4 is a flow sheet of a process for (meth)acrylic acid compound production according to the third aspect of the invention.

FIG. 4 is a flow sheet of a process for (meth)acrylic acid compound production according to the third aspect of the invention.

First, a production apparatus to be used in the process according to the third aspect of the invention is outlined based on FIG. 4.

E denotes a purification column. A supply line 11 for a liquid to be purified has been attached to the purification column E.

F denotes a reboiler. To the inflow side of the reboiler F has been connected a reboiler circulation line 13 branching off from a bottom withdrawal line 12 attached to the bottom of the purification column E. The outflow side thereof has been connected to a lower part of the side wall of the purification column E through the reboiler circulation line 14.

G denotes a condenser. The inflow side of the condenser G has been connected to a top gas line 15 attached to the top of the purification column E. The outflow side thereof has been connected to the inflow side of a reflux vessel J through a line.

Furthermore, the outflow side of the reflux vessel J has been connected to an upper part of the side wall of the purification column E by a reflux line 16. A product withdrawal line 17 branches off from this reflux line 16.

H denotes a belt condenser. The inflow side of this belt condenser H has been connected to the reflux vessel J through a bent line 18.

K denotes a heat exchanger for product temperature regulation. This heat exchanger K for product temperature regulation is an important apparatus which is a point of the invention. The inflow side of the heat exchanger K for product temperature regulation has been connected to the product withdrawal line 17, while the outflow side thereof has been connected to the inflow side of a storage tank M through a tank P for quality verification.

This heat exchanger K for product temperature regulation need not especially be of a special type, and heat exchangers of various types can be used, such as a plate type heat exchanger with fixed tubes, spiral type heat exchanger, compabloc type heat exchanger, and plate type heat exchanger.

In this embodiment, the tank P for quality verification has been disposed in the product withdrawal line 17 between the outflow side of the heat exchanger K for product temperature regulation and the inflow side of the storage tank M. However, it may be disposed in that part of the product withdrawal line 17 which is located on the inflow side of the heat exchanger K for product temperature regulation. In some cases, the tank P for quality verification can be omitted.

The storage tank M has, built therein, a coil O for liquid temperature regulation.

N denotes a heat exchanger for tank liquid temperature regulation. The inflow side of this heat exchanger N for tank liquid temperature regulation has been connected to the outflow side of the storage tank M through a tank withdrawal line 20 and a circulation line 22. The outflow side thereof has been connected to the side wall of the storage tank M by a line.

Although both of the coil O for liquid temperature regulation and the heat exchanger N for tank liquid temperature regulation may be fitted to the storage tank M as in this embodiment, only either of the two is generally fitted.

Furthermore, a withdrawal line 21 for shipping, etc. branches off from the joint between the tank withdrawal line 20 and the circulation line 22.

Next, steps of this production process of the invention will be outlined likewise based on FIG. 4.

A raw liquid supplied to the purification column E through the supply line 11 undergoes a purification operation, and part thereof flows down to the bottom of the purification column E. The bottoms are introduced into the bottom withdrawal line 12, and part thereof passes through the reboiler reflux line 13 and the reboiler F and is returned to the purification column E through the reboile reflux line 14. The remainder is discharged outside through the bottom withdrawal line 12.

Since the bottoms discharged outside contain valuable substances in a large amount, they in some cases are returned to the purification system or supplied to a valuable-recovery apparatus. In the case where valuable substances are not recovered, the bottoms are treated as a waste.

On the other hand, the raw liquid supplied to the purification column E is purified and changes into a gas, which is introduced from the top of the purification column E into the condenser G through the top gas line 15.

The gas is cooled by the condenser G and changes into a purified (meth)acrylic acid compound condensate of about 40° C. This condensate passes through the reflux vessel J, and part thereof is returned to the purification column E through the reflux line 16, while the remaining part of the condensate is introduced into the product withdrawal line 17.

Furthermore, the vent gas introduced from the reflux vessel J into the vent condenser H through the bent line 18 is cooled in the vent condenser H to recover valuable substances from the gas. The remainder is introduced into a vacuum system or the like (not shown) for regulating the pressure in the purification column E.

Incidentally, the condensate of about 40° C. which has been introduced into the product withdrawal line 17 is sent to the heat exchanger K for product temperature regulation. After the temperature of this condensate is further regulated here, the condensate is supplied to the storage tank M through the tank P for quality verification.

The temperature of the purified (meth)acrylic acid compound which is being supplied to the storage tank M is from 0 to 35° C., more preferably from 5 to 35° C. With respect to ones having a solidifying point of 13° C., such as acrylic acid, it is preferred to regulate the temperature thereof to a valve higher than the solidifying point, e.g., to 15 to 25° C.

Optimum values of the temperature in the storage tank M in which the (meth)acrylic acid compound is stored vary depending on the kind of the compound stored. In general, however, the temperature is from 0 to 35° C. This temperature may be determined while taking account of the solidifying temperature as in the case described above.

The temperature of the condensate is regulated with the heat exchanger K for product temperature regulation so that the temperature of the condensate which is being supplied to the storage tank M is in the preferred temperature range shown above, before the condensate is sent from the heat exchanger K.

The cooling medium used in the heat exchanger K for product temperature regulation comprises one or more of coolants such as waters represented by tap water, industrial water, re-cooled water, boiler water, steam condensate water, and the like, seawater, and organic media. With such cooling medium, the condensate is regulated so as to have a given temperature.

The purified (meth)acrylic acid compound residing in the storage tank M is preferably regulated so as to have a given temperature, i.e., from 0 to 35° C., by means of the coil O for liquid temperature regulation which has been built in the tank M or by circulating part of the purified (meth)acrylic acid compound residing in the tank M to the heat exchanger N for tank liquid temperature regulation, which has been disposed outside, through the tank withdrawal line 20 and the circulation line 22.

On the other hand, the purified (meth)acrylic acid compound residing in the storage tank M and regulated so as to have a given temperature is shipped as a product through the tank withdrawal line 20 and the withdrawal line 21 for shipping, etc.

An important point of the production process according to the third aspect of the invention resides in that the fresh condensate obtained by condensation in the condenser G is not directly supplied to the storage tank M but supplied to the storage tank M after having been cooled to or below the temperature of the purified (meth)acrylic acid compound residing in the storage tank M by passing the condensate through the heat exchanger K for product temperature regulation disposed before the storage tank M.

Here, the amount of heat transferred Q is represented by the equation $Q=Ah\Delta T$ (A is the area of heat-transfer surface, h is the coefficient of heat transfer, and $\Delta T$ is temperature difference).

Consequently, when the fresh condensate obtained by condensation in the condenser G is directly supplied to the storage tank M and mixed with the purified (meth)acrylic acid compound residing in the storage tank M and the resultant mixture of the purified (meth)acrylic acid compound is cooled in order to regulate its temperature to a given value as in related-art techniques, then a heat exchanger or the like which has a large area of heat-transfer surface A is necessary because the temperature difference $\Delta T$ in this regulation is small.

In contrast, when a heat exchanger K for product temperature regulation is separately disposed as in the third aspect of the invention, then the temperature of the condensate at the inlet of the heat exchanger K is about 40° C., which is the temperature of the condensate at the outlet of the condenser G. In addition, the set temperature of the condensate at the outlet of the heat exchanger K can be a low temperature not higher than the temperature of the purified (meth)acrylic acid compound residing in the storage tank M.

Consequently, the temperature difference $\Delta T$ between the inlet and outlet of the heat exchanger K can be large and, hence, a given quantity of heat transferred Q can be obtained even when the area of heat-transfer surface A for the heat exchanger K is small.

As a result, it has become possible to reduce the area of heat-transfer surface for the whole heat exchangers which is necessary for the temperature regulation of the purified (meth)acrylic acid compound residing in the storage tank M.

The process for producing an easily polymerizable compound according to the fourth aspect of the invention will be explained below based on accompanying drawings.

Figure 5:
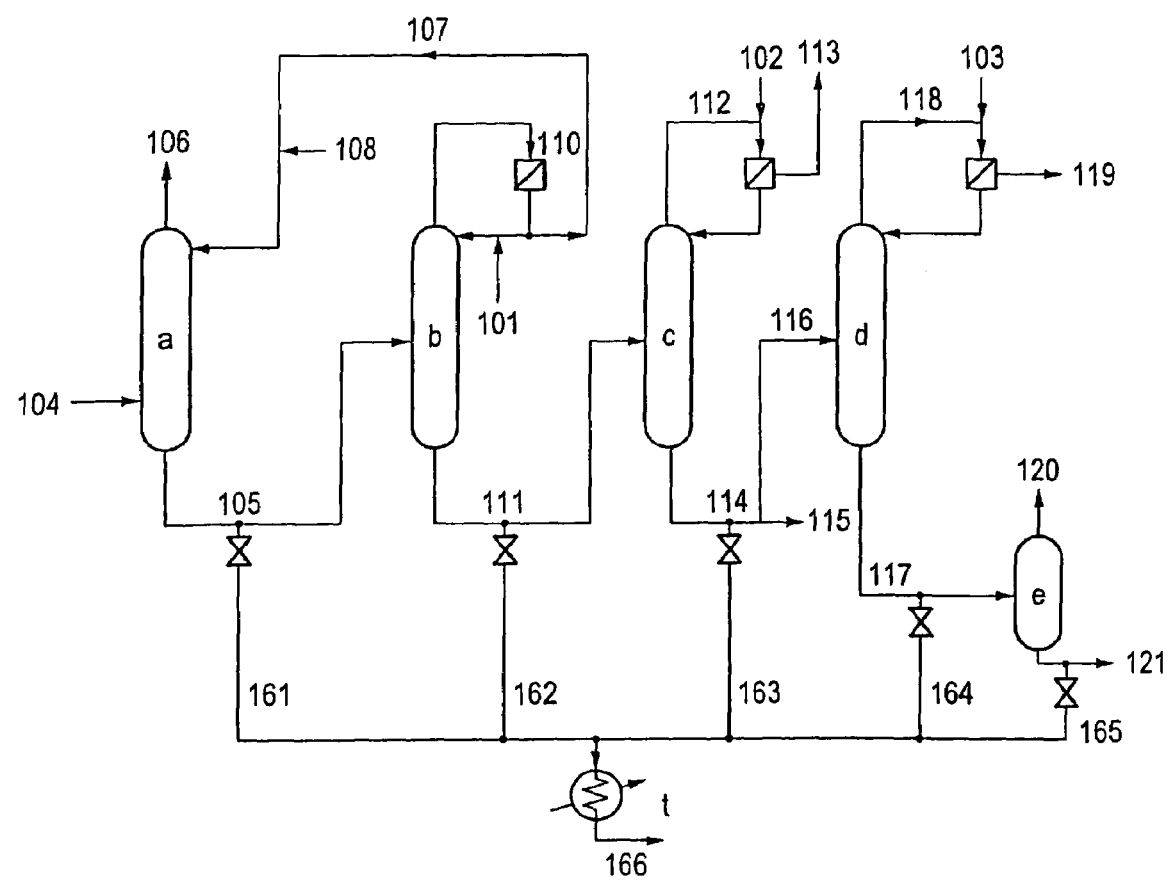
FIG. 5 is one example of flow diagrams of a process for acrylic acid production according to the fourth aspect of the invention.

FIG. 5 is one example of flow diagrams of a process for acrylic acid production according to the fourth aspect of the invention.

Figure 6:
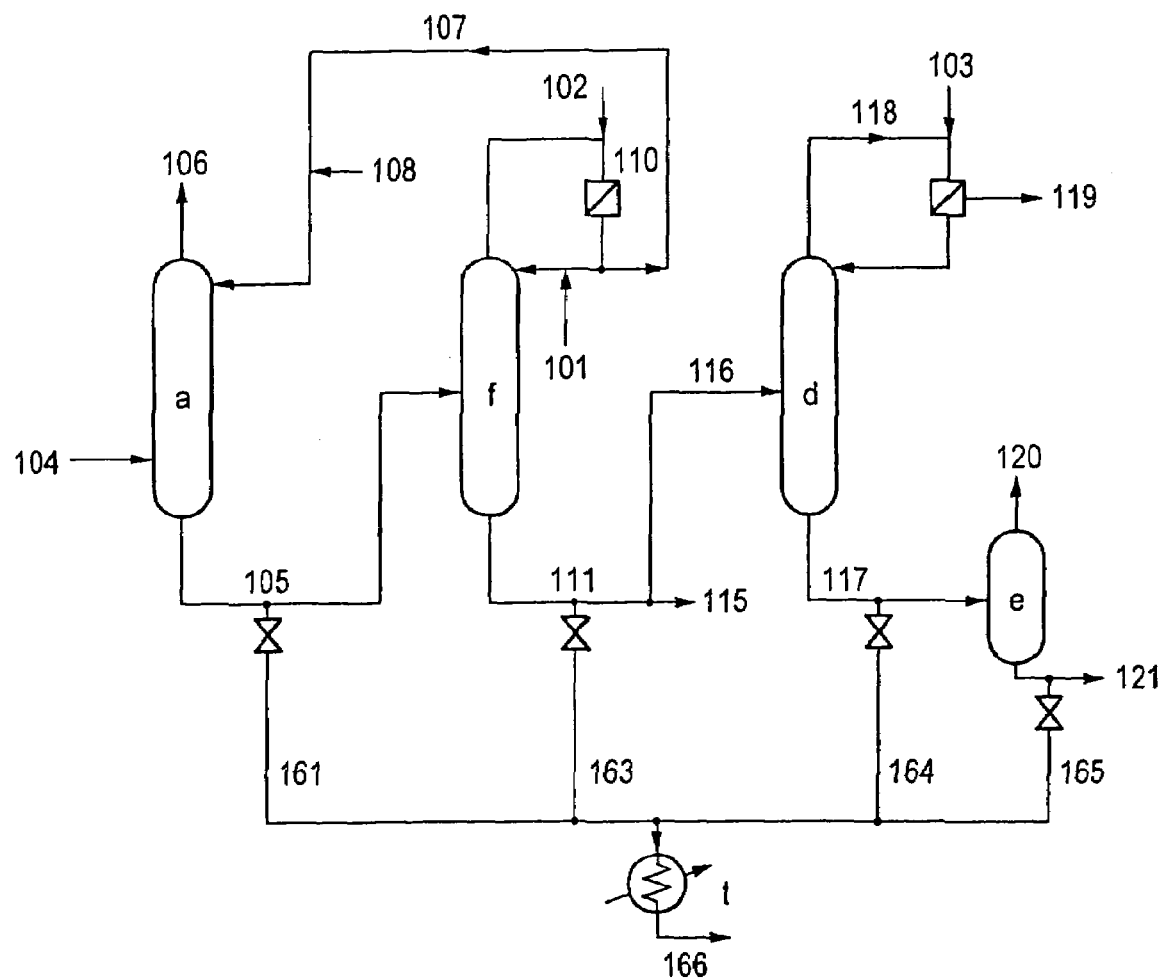
FIG. 6 is another example of flow diagrams of a process for acrylic acid production according to the fourth aspect of the invention.

FIG. 6 is another example of flow diagrams of a process for acrylic acid production according to the fourth aspect of the invention.

Figure 7:
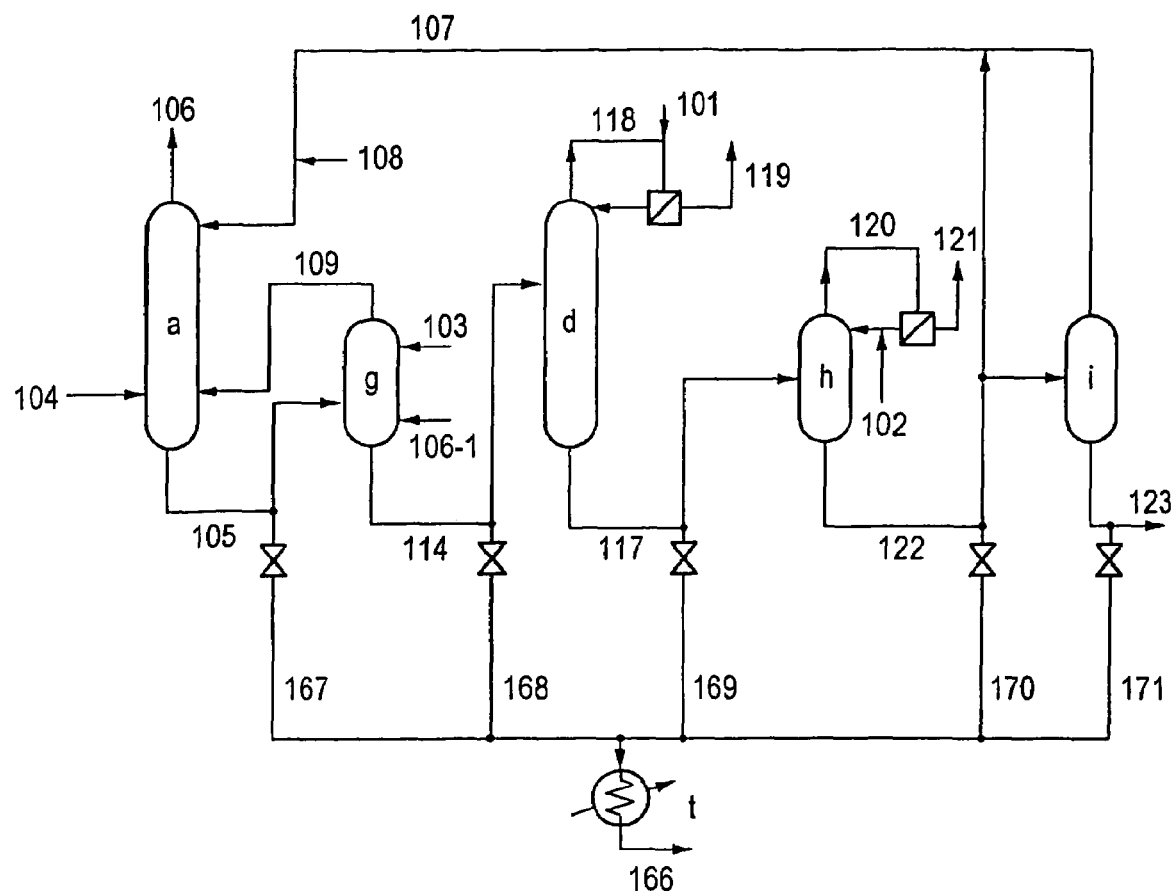
FIG. 7 is still another example of flow diagrams of a process for acrylic acid production according to the fourth aspect of the invention.

FIG. 7 is still another example of flow diagrams of a process for acrylic acid production according to the fourth aspect of the invention.

Figure 8:
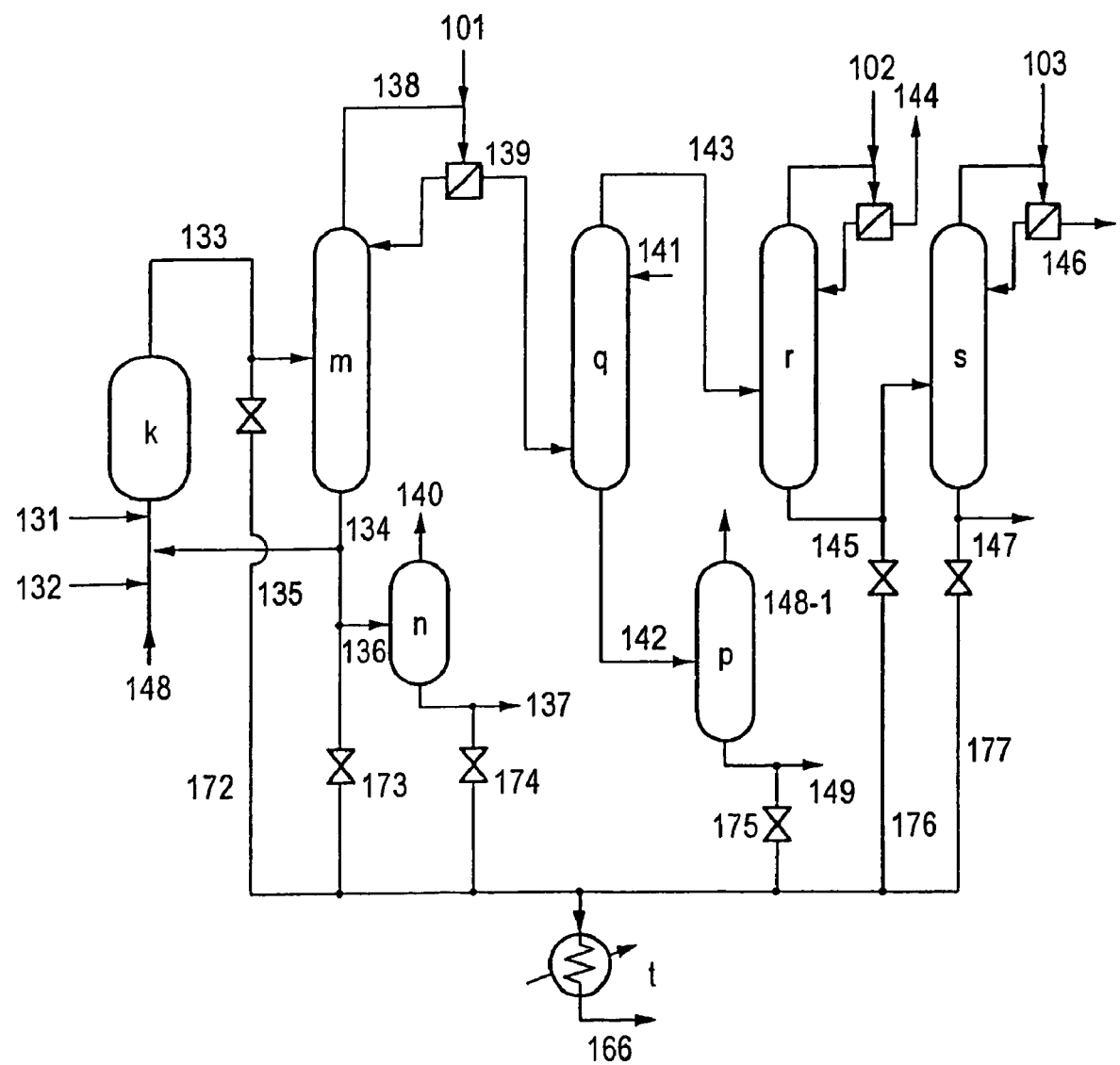
FIG. 8 is one example of flow diagrams of a process for acrylic ester production according to the fourth aspect of the invention.

FIG. 8 is one example of flow diagrams of a process for acrylic ester production according to the fourth aspect of the invention.

Figure 9:
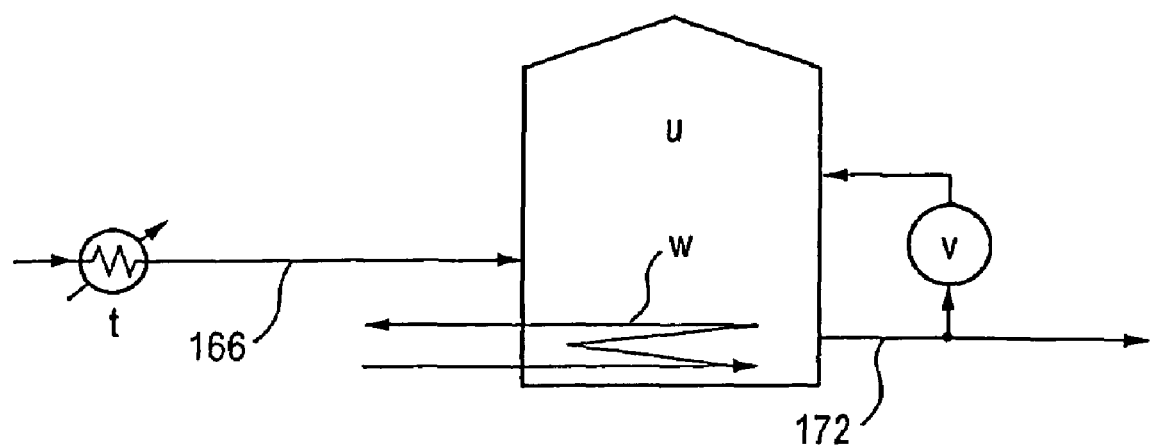
FIG. 9 is a sectional view of one embodiment of the off-specification product storage tank according to the fourth aspect of the invention.

FIG. 9 is a sectional view of one embodiment of the off-specification product storage tank according to the fourth aspect of the invention.

First, the production process according to the fourth aspect of the invention will be outlined based on FIG. 5.

Symbol a denotes an acrylic acid collection column. An acrylic-acid-containing gas obtained by the catalytic vapor-phase oxidation of propane, propylene, and/or acrolein with a gas comprising molecular oxygen is introduced into this acrylic acid collection column a through a line 104. In this column, the acrylic-acid-containing gas is brought into contact with water to obtain an aqueous acrylic acid solution.

Incidentally, 106 denotes a discharge gas line, which has been connected to the top of the acrylic acid collection column a.

Subsequently, the aqueous acrylic acid solution is sent to a dehydration column b through a line 105 connected to the bottom of the acrylic acid collection column a.

An entrainer is supplied to the dehydration column b, and an azeotropic mixture comprising water and the entrainer is obtained through the column top by distillation. Through the bottom of the column, acrylic acid containing acetic acid is obtained.

The azeotropic mixture which comprises water and the entrainer and has been obtained through the column top by distillation is introduced into a storage vessel 110, wherein the mixture is separated into an organic phase consisting mainly of the entrainer and an aqueous phase consisting mainly of water.

The organic phase is circulated to the dehydration column b, while the aqueous phase is circulated to the acrylic acid collection column a through a line 107 and used as collecting water to be contacted with the acrylic-acid-containing gas. Thus, the two phases can be effectively utilized.

Water is supplied according to need through a line 108 connected to a part in the line 107. For the purpose of recovering the entrainer present in the process liquid in the line 107, the aqueous phase may be circulated through an entrainer recovery column (not shown) to the acrylic acid collection column a.

The crude acrylic acid withdrawn through a line 111 connected to the bottom of the dehydration column b is introduced into a low-boiling separation column (acetic acid separation column) c in order to remove the acetic acid remaining therein.

The acetic acid here is discharged through a line 112 connected to the column top and through a line 113. Thus, the acetic acid is separated and removed.

There are cases where the acetic acid in the line 113 is partly or wholly returned to the process because it contains acrylic acid.

The solution withdrawn through a line 114 connected to the bottom of the low-boiling separation column (acetic acid separation column) c gives acrylic acid containing substantially no acetic acid.

Since this acrylic acid has a considerably high purity, it can be used by itself as a raw material for an acrylic ester. In some cases, this acid can be shipped as a product through a line 115.

In order to obtain acrylic acid having a higher purity, the acrylic acid obtained in the low-boiling separation column (acetic acid separation column) c is introduced into a high-boiling separation column (acrylic acid purification column) d through a line 114 connected to the bottom of the separation column c and through a line 116. High-boiling substances are separated and removed through a line 117 connected to the bottom of the high-boiling separation column d.

The high-purity acrylic acid which has been purified in the high-boiling separation column d is withdrawn and obtained through a line 118 connected to the top of the column and through a line 119.

The high-boiling substances in the line 117 are introduced into a high-boiling decomposition reactor e, and part thereof is recovered as acrylic acid and sent to the process through a line 120 connected to the top of the reactor e.

High-boiling substances are separated and removed through a line 121 connected to the bottom of the reactor e.

In the process according to the fourth aspect of the invention, a polymerization inhibitor-containing liquid to be introduced through the tops of the dehydration column b, low-boiling separation column (acetic acid separation column) c, and high-boiling separation column (acrylic acid purification column) d is supplied through any one of or two or more of lines 101 to 103.

The term polymerization inhibitor herein is a general term for stable radical substances or substances which add to or is apt to add to a radical to form a stable radical.

In some cases, such a substance is called a polymerization retarder, polymerization inhibitor, polymerization terminator, polymerization rate-reducing agent, etc. according to purposes. In the fourth aspect of the invention, however, the substance is called a polymerization inhibitor.

Numerals 161 to 165 denote plant withdrawal lines. These lines have been connected to the lines 105, 111, 114, 117, and 121 through on-off valves.

These withdrawal lines have been gathered and then connected to a heat exchanger t for off-specification liquid temperature regulation.

When operation is initiated in the process described above, the process liquids are withdrawn through the plant withdrawal lines and sent to an off-specification product storage tank u, which will be described later, through the heat exchanger t for off-specification liquid temperature regulation and through a line 166, until property values for these process liquids reach the design values suitable for the operation of the respective apparatus and the process liquids become capable of being supplied to the next apparatus connected.

When the operation is stopped, the liquid which has resided in each apparatus is withdrawn through the plant withdrawal line and sent to the off-specification product storage tank u through the heat exchanger t for off-specification liquid temperature regulation.

As shown in the figure, the plant withdrawal lines 105, 111, 114, 117, and 121 generally have on-off valves disposed therein. During operation, these valves are usually closed.

The kind of the heat exchanger t for off-specification liquid temperature regulation to be used in the fourth aspect of the invention is not particularly limited. For example, use can be made of a plate type heat exchanger with fixed tubes, spiral type heat exchanger, compabloc type heat exchanger, plate type heat exchanger, or the like.

In the case of a plate type heat exchanger with fixed tubes, it is preferred to supply a heat medium and an off-specification liquid to the shell side and the tube side, respectively. The off-specification liquid in some cases contains solid matters such as a polymer and a polymerization inhibitor. In case where such solid matters have caused soils, the tube side is more easy to clean to remove such soils.

The heat medium for temperature regulation to be used in the heat exchanger t for temperature regulation can be one or more of waters represented by tap water, industrial water, boiler water, steam condensate water, and the like, seawater, organic media, and the like.

The temperature of this heat medium for temperature regulation is preferably from 0 to 40° C. Although heat media having a temperature lower than 0° C. or exceeding 40° C. can be used, such media are economically disadvantageous. This is because a heat medium having a temperature lower than 0° C. should be newly produced, while a heat medium having a temperature exceeding 40° C. necessitates an increased area of heat-transfer surface for the heat exchanger t.

The temperature of the off-specification liquid, before undergoing temperature regulation in the heat exchanger t for off-specification liquid temperature regulation, is generally from 61 to 200° C. The control temperature of the storage tank u for an off-specification product for the (meth) acrylic acid compound is generally from 0 to 60° C., more preferably from 0 to 40° C., although optimum values thereof vary according to kind. It is preferred that the outlet temperature of the heat exchanger t for off-specification liquid temperature regulation be made equal to that temperature.

When that temperature is lower than 0° C., there are cases where the water in the tank freezes. Temperatures thereof exceeding 60° C. are undesirable because the rate of reactions in which the water, alcohol, and (meth)acrylic acid compound contained in the off-specification liquid change into high-boiling substances by the Michael addition reaction is increased and high-boiling substances are formed in a large amount.

FIG. 9 shows the off-specification product storage tank u. The off-specification liquid which has undergone temperature regulation with the heat exchanger t for off-specification liquid temperature regulation is transported to this storage tank u through the line 166.

For keeping the liquid temperature in the off-specification product storage tank u at a given control temperature, this tank u suitably has a coil w for liquid temperature regulation therein or a heat exchanger v for liquid temperature regulation outside.

The liquid in the off-specification product storage tank u is generally supplied through a line 172 to a line or a column or vessel in the processes of FIGS. 5 to 8 according to the composition thereof. However, there are cases where when such recovery/recycling is impossible, the liquid is transported to incineration facilities or wastewater treatment facilities (not shown).

FIG. 6 is another example of flow diagrams of a process for acrylic acid production. This is a process in which the dehydration column b and low-boiling separation column (acetic acid separation column) c in FIG. 5 have been united into one column, i.e., a distillation column f. The flows of substances are basically the same as in FIG. 5.

FIG. 7 is still another example of flow diagrams of a process for acrylic acid production.

Symbol a denotes an acrylic acid collection column. An acrylic-acid-containing gas obtained by the catalytic vapor-phase oxidation of propane, propylene, and/or acrolein with a gas comprising molecular oxygen is introduced into this acrylic acid collection column a through a line 104. In this column, the acrylic-acid-containing gas is brought into contact with a solvent to obtain an acrylic-acid-containing solution.

Incidentally, 106 denotes a discharge gas line, which has been connected to the top of the acrylic acid collection column a.

Subsequently, the acrylic-acid-containing solution is sent to a stripping column g through a line 105 connected to the bottom of the acrylic acid collection column a.

A gas (e.g., the gas in the line 106 discharged through the top of the acrylic acid collection column a or a gas obtained by oxidizing and removing organic matters from the gas in the line 106) is supplied to the stripping column g through a line 106-1. The water and acetic acid recovered by distillation through the column top are introduced into the acrylic acid collection column a through a line 109.

On the other hand, acrylic acid containing the solvent is withdrawn through a line 114 connected to the bottom of the stripping column g. In order to obtain high-purity acrylic acid, the solvent-containing acrylic acid is introduced into a high-boiling separation column (acrylic acid purification column) d. High-boiling substances are separated and removed through a line 117 connected to the bottom of the high-boiling separation column d.

The high-purity acrylic acid which has been purified in the high-boiling separation column d is withdrawn and obtained through a line 118 connected to the top of the column and through a line 119.

The high-boiling substances in the line 117 specifically are maleic anhydride, benzaldehyde, and the like. These high-boiling substances are introduced into a high-boiling removal column h and discharged through a line 120 connected to the top of the high-boiling removal column h and through a line 121.

The solution withdrawn through a line 122 connected to the bottom of the high-boiling removal column h is introduced into a solvent purification column i.

The solvent recovered in the solvent purification column i is returned to the acrylic acid collection column a through a line 107 connected to the top of the column i. Incidentally, part or most of the solution in the line 122 may be directly returned to the acrylic acid collection column a through the line 107.

Higher-boiling substances are separated and removed from the bottom of the solvent purification column i through a line 123 connected to the bottom.

In this process according to the fourth aspect of the invention, a polymerization inhibitor-containing liquid to be introduced into the stripping column g, high-boiling separation column (acrylic acid purification column) d, and high-boiling removal column h is supplied through any one of or two or more of lines 101 to 103.

Numerals 167 to 171 denote plant withdrawal lines. These lines have been connected to the lines 105, 114, 117, 122, and 123 through on-off valves.

These withdrawal lines have been gathered and then connected to a heat exchanger t for off-specification liquid temperature regulation.

The off-specification liquids which have been withdrawn through the lines 167 to 171 are regulated with the heat exchanger t for off-specification liquid temperature regulation so as to have a given temperature and then transported through a line 166 to the off-specification product storage tank u shown in FIG. 9.

FIG. 8 is an example of flow diagrams of a process for acrylic ester production.

Symbol k denotes an esterification reactor. Acrylic acid, an alcohol, circulating acrylic acid, and a circulating alcohol are supplied to the esterification reactor k through a line 131, line 132, line 135, and line 148, respectively. This esterification reactor k has been packed with a catalyst such as a strongly acidic ion-exchange resin.

Symbol m denotes an acrylic acid separation column. An esterification reaction mixture comprising the ester yielded, unreacted acrylic acid, unreacted alcohol, and water yielded is supplied to this acrylic acid separation column m through a line 133 connected to the top of the esterification reactor k.

Bottoms containing substantially all of the unreacted acrylic acid are withdrawn through a line 134 connected to the bottom of the acrylic acid separation column m, and are supplied as a circulating liquid to the esterification reactor k through a line 135.

Symbol n denotes a high-boiling decomposition reactor. Part of the bottoms in the acrylic acid separation column m is supplied to this high-boiling decomposition reactor n through the line 134, connected to the bottom of the acrylic acid separation column m, and a line 136.

A valuable substance obtained through decomposition in the high-boiling decomposition reactor n is circulated to the process through a line 140 connected to the top. That part in the process to which the valuable substance is circulated varies depending on process conditions.

Furthermore, high-boiling impurities including polymers are removed from the system through a line 137 connected to the bottom of the high-boiling decomposition reactor n.

Symbol q denotes an alcohol extraction column. The ester yielded, unreacted alcohol, and water yielded which have been obtained by distillation through the top of the acrylic acid separation column m are introduced into this alcohol extraction column q through a line 138 and a line 139. Part of these distillates is circulated as a circulating liquid to the acrylic acid separation column m.

Water for alcohol extraction is further supplied to the alcohol extraction column q through a line 141.

Symbol p denotes an alcohol recovery column. Water containing the alcohol is introduced into the alcohol recovery column p through a line 142 connected to the bottom of the alcohol extraction column q. The alcohol recovered here is circulated to the esterification reactor k through a line 148-1.

Furthermore, the water in the alcohol recovery column p is removed from the system through a line 149 connected to the bottom of the column.

Symbol r denotes a low-boiling separation column. A crude acrylic ester is supplied to this low-boiling separation column r through a line 143 connected to the top of the alcohol extraction column q.

Low-boiling substances containing the acrylic ester are withdrawn and circulated to a part in the process through a line 144 connected to the top of the low-boiling separation column r. That part in the process to which the low-boiling substances are circulated varies depending on process conditions.

Symbol s denotes an acrylic ester product purification column. The crude acrylic ester from which low-boiling substances have been removed is supplied to this acrylic ester product purification column s through a line 145 connected to the bottom of the low-boiling separation column r.

The acrylic ester having a high purity is obtained through a line 146 connected to the top of the acrylic ester product purification column s.

On the other hand, the acrylic ester containing high-boiling substances in a small amount is withdrawn and circulated to a part in the process through a line 147 connected to the bottom of the purification column s. That part in the process to which the acrylic ester is circulated varies depending on process conditions.

In this process according to the fourth aspect of the invention, a polymerization inhibitor-containing liquid to be introduced into the acrylic acid separation column m, low-boiling separation column r, and acrylic ester product purification column s is supplied through any one of or two or more of lines 101 to 103.

Numerals 172 to 177 denote plant withdrawal lines. These lines have been connected to the lines 133, 134, 137, 149, 145, and 147 through on-off valves.

These withdrawal lines have been gathered and then connected to a heat exchanger t for off-specification liquid temperature regulation.

The off-specification liquids which have been withdrawn through the lines 172 to 177 are regulated with the heat exchanger t for off-specification liquid temperature regulation so as to have a given temperature and then transported through a line 166 to the off-specification product storage tank u shown in FIG. 9. The liquid in the storage tank u undergoes the same process as in FIG. 5.

EXAMPLES

Example 1

An Example in which a storage tank A is used as an inspection tank will be explained based on FIG. 1.

Acrylic acid having a purity of 99.8% by weight was obtained by acrylic acid production steps comprising: a reaction step in which propylene as a starting material was subjected to a catalytic vapor-phase oxidation reaction; a collection step in which the acrylic-acid-containing gas obtained in the reaction step was absorbed in water to obtain an aqueous acrylic acid solution; and a purification step in which impurities such as water, acetic acid, maleic anhydride, and acrylic acid dimer were separated from the resultant aqueous acrylic acid solution to obtain an acrylic acid product.

This acrylic acid is supplied in a necessary amount to the storage tank A (inspection tank) through the acceptance piping 1. Thereafter, the valve D disposed in the acceptance piping 1 is closed, and the acrylic acid supplied to the inspection tank A is ascertained to satisfy product specifications. After termination of the inspection, the acrylic acid is transported from the inspection tank A to a next step through the delivery piping 2 and the valve D disposed in this delivery piping 2.

During this operation, the acrylic acid in the inspection tank A is circulated through the circulation line 3 and also through the circulation line 4 and then returned to the inspection tank A with the circulating pump B. Consequently, acrylic acid was supplied to the acceptance piping 1 through the circulation line 4, and the liquid in the piping retained the state of always flowing.

Comparative Example 1

In the case where the apparatus shown in FIG. 1 was not equipped with the circulation line 4, even when the valve D disposed in the acceptance piping 1 was reopened after the operation described in Example 1, acrylic acid could not be supplied to the inspection tank A because the acrylic acid in the acceptance piping 1 had frozen. It was hence necessary to melt the frozen acrylic acid with 40° C. warm water, before acrylic acid was supplied to the inspection tank A.

Example 2

In a 100-m³ acrylic acid storage tank constructed 10 years ago, the flange parts fitted to the tank have been jointed and fixed by means of bolts and nuts using sheet gaskets made of Teflon interposed therebetween.

The material of each of the flanges, bolts, and nuts used here was SUS304 stainless steel.

Because liquid leakage through the flange part joints was observed, the liquid leakage was stopped by tightening the bolts and nuts. Since then, the apparatus could be used over 10 years without posing a problem of liquid leakage at all.

Comparative Example 2

In Example 2, the material of the flange parts used was SUS304 stainless steel and the material of the bolts and nuts used was carbon steel, which is an SS (soft steel) material. Furthermore, the gaskets used were Teflon-covered gaskets.

Because liquid leakage through the flange part joints was observed, the bolts and nuts were tightened in order to stop the liquid leakage. However, the liquid leakage could not be completely stopped.

The flange parts were disassembled and examined. As a result, the bolt diameter had decreased to about ⅔ due to corrosion and the base of the gaskets had been deprived of its elasticity due to deterioration.

Example 3

In FIG. 4, acrylic acid was purified in the purification column E, and this acrylic acid was passed through the condenser G and the reflux vessel J to obtain a 40° C. condensate. This condensate was caused to flow through the product withdrawal line 17 into the heat exchanger K for product temperature regulation, at a rate of 1,275 kg/hr. The condensate thus underwent heat exchange and flowed out after having been cooled to 20° C. This condensate was supplied to the storage tank M the temperature in which was regulated with the heat exchanger N for tank liquid temperature regulation so as to be always kept at 20° C. Thereafter, the condensate was shipped as a product through the withdrawal line 21 for shipping, etc.

The heat exchanger K for product temperature regulation was a spiral type heat exchanger having an area of heat-transfer surface of 4.5 m², and cooling water having a temperature of 15° C. was used therein.

The heat exchanger N for tank liquid temperature regulation also was a spiral type heat exchanger having an area of heat-transfer surface of 17.5 m², and cooling water having a temperature of 15° C. was used therein.

Comparative Example 3

In the case where the heat exchanger K for product temperature regulation in Example 3 was omitted, it was necessary that for always keeping the temperature of the purified (meth)acrylic acid compound residing in the storage tank M at 20° C., the area of heat-transfer surface for the heat exchanger N for tank liquid temperature regulation be 25.5 m².

Consequently, the heat exchanger in Comparative Example 3 was required to have an area of heat-transfer surface of 25.5 m², in contrast to the total area of heat-transfer surface of 22 m² (4.5+17.5) for the heat exchangers in Example 3.

Example 4

In a plant having an annual output capacity of 80,000 t and employing the acrylic acid process of FIG. 5, a heat exchanger t for off-specification liquid temperature regulation having an area of heat-transfer surface of 186 m² was disposed. The heat medium for cooling employed in this heat exchanger t for off-specification liquid temperature regulation was re-cooled water having a temperature of 27° C., and passed at a flow rate of 251 t/h.

For the off-specification product storage tank u was disposed a heat exchanger v for cooling which had an area of heat-transfer surface of 18 m². The amount of circulation of liquid in the tank u through the heat exchanger v for cooling was 19 t/h. The heat medium for cooling employed in this heat exchanger v for cooling was cold water having a temperature of 15° C., and passed at a flow rate of 5 t/h.

Because of a periodic maintenance work conducted once a year, the plant was stopped.

For the operation stopping, off-specification liquids having a temperature of 90° C. discharged from the plant system were supplied at 79 t/h (specific gravity, 0.95) to the heat exchanger t for off-specification liquid temperature regulation, cooled to 40° C., and then stored in the off-specification storage tank u in an amount of 260 m³.

The amount of a dimer yielded from the acrylic acid contained in the off-specification liquids increased at a rate of about 900 weight ppm of the acrylic acid per day because the storage was initiated at 40° C.

The temperature was further lowered by the heat exchanger v for cooling, and the amount of the dimer yielded was further reduced.

Comparative Example 4

In the next year, the same operation as in Example 4 was performed, except that for the purpose of a test, the off-specification liquids were sent to the off-specification product storage tank u without via the heat exchanger t for off-specification liquid temperature regulation in Example 4.

Although the heat exchanger v for cooling was used to cool the off-specification liquids, the cooling required 42 hours before the temperature thereof reached 40° C. Because of this, the amount of a dimer yielded at 40° C. in Example 4 increased by 20% by weight based on the acrylic acid.

Incidentally, the amount of a dimer yielded from acrylic acid at 90° C. increases at a rate of about 160,000 ppm of the acrylic acid per day.

While the invention has been described in detail and with reference to specific embodiments thereof, it will be apparent to one skilled in the art that various changes and modifications can be made therein without departing from the spirit and scope thereof.

This application is based on Japanese patent application filed on Nov. 7, 2001 (Application No. 2001-341348), Japanese patent application filed on Dec. 25, 2001 (Application No. 2001-390770), Japanese patent application filed on Jan. 10, 2002 (Application No. 2002-003223), and Japanese patent application filed on Jan. 28, 2002 (Application No. 2002-017846), the contents thereof being herein incorporated by reference.

INDUSTRIAL APPLICABILITY

According to the first aspect of the invention, acrylic acid can be prevented from polymerizing or freezing in the acceptance piping and delivery piping connected to a storage tank and from thus clogging the pipings. (Meth)acrylic acid and an ester thereof can hence be handled stably and a reduction in product loss can be attained.

In the second aspect of the invention, a corrosion-resistant material is used as the flange parts attached to the handling instrument side of a tank or vessel in a production apparatus, storage apparatus, or the like in which a corrosive liquid is handled, and as the flanges bonded thereto and the bolts and nuts used for jointing and fixing the flange parts. Furthermore, as the gasket to be interposed between the flange parts is used a sheet gasket made of Teflon which has excellent corrosion resistance and moderate elasticity. Due to this constitution, in case of liquid leakage, this can be easily and completely stopped by tightening the bolts and nuts.

When the method according to the third aspect of the invention is used, the heat exchanger disposed for the purpose of regulating a purified (meth)acrylic acid liquid residing in a storage tank installed for product storage or shipping so as to have an appropriate temperature can be made to have a smaller area of heat-transfer surface than in related-art techniques. Because of this, the whole apparatus can be smaller, resulting in a reduction in equipment cost.

Before a fresh condensate obtained by condensation through steps in a purification column and a condenser is supplied to a storage tank, the temperature of this condensate is regulated to or below the temperature of a purified (meth)acrylic acid compound residing in the storage tank. Because of this, the temperature of the purified (meth)acrylic acid compound in the storage tank never increases even temporarily, and the purified (meth)acrylic acid compound is inhibited from giving a polymer in the storage tank.

Especially in a process for acrylic acid production, that method is effective in inhibiting the formation of acrylic acid dimer.

According to the fourth aspect of the invention, when off-specification products discharged from a plant for producing acrylic acid or the like are temporarily stored in a tank for the purpose of recovering valuable substances, the off-specification products are cooled before being transported to the tank. It has thus become possible to recover the valuable substances at a high efficiency.

The invention claimed is:

1. A process for (meth) acrylic acid compound production which is a process for producing and/or purifying a (meth) acrylic acid compound, characterized in that the temperature of a purified (meth) acrylic acid compound obtaind which is being supplied to a storage tank is regulated so as to be not higher than the temperature of the purified (meth) acrylic acid compound residing in the storage tank.

2. The process for (meth) acrylic acid compound production as claimed in claim 1, wherein the purified (meth) acrylic acid compound is a condensate as a distillate from a column top, and a line system for supplying the condensate to the storage tank has a heat exchanger disposed therein.

3. The process for (meth) acrylic acid compound production as claimed in claim 1 or 2, wherein the temperature of the purified (meth) acrylic acid compound which is being supplied to the storage tank is from 0 to 35° C.

4. A process for producing an easily polymerizable compound which is a (meth) acrylic acid compound, characterized in that the temperature of a (meth) acrylic acid compound-containing liquid which has been discharged as an off-specification product and is being supplied to a storage tank is regulated so as to be not higher than the temperature of the off-specification liquid stored in the storage tank.

5. The process for producing an easily polymerizable compound as claimed in claim 4, characterized in that the temperature of the off-specification liquid stored in the storage tank is from 0 to 60° C.

6. The process for producing an easily polymerizable compound as claimed in claim 4 or 5, characterized in that the temperature of the off-specification liquid before being regulated is from 61 to 200° C.

7. The process for producing an easily polymerizable compound as claimed in claim 4, characterized in that the off-specification liquid is either bottoms discharged from an evaporation column, distillation column, oxidation reactor, or extraction column or a liquid obtained by heating the bottoms.

* * * * *